United States Patent
Utsumi

(10) Patent No.: US 6,848,793 B2
(45) Date of Patent: Feb. 1, 2005

(54) PROJECTOR APPARATUS

(75) Inventor: Kenichiro Utsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/736,080

(22) Filed: Dec. 15, 2003

(65) Prior Publication Data

US 2004/0150799 A1 Aug. 5, 2004

(30) Foreign Application Priority Data

Dec. 19, 2002 (JP) .................................... P2002-368895
Nov. 4, 2003 (JP) .................................... P2003-374546

(51) Int. Cl.$^7$ ............................................ G03B 21/56
(52) U.S. Cl. ...................... 353/74; 359/443; 248/917
(58) Field of Search .......................... 353/74, 77, 78, 353/79; 359/443, 454, 455, 456, 457, 460; 248/917, 918; 348/836

(56) References Cited

U.S. PATENT DOCUMENTS

| 5,699,131 A | * | 12/1997 | Aoki et al. .................. 348/832 |
| 6,384,980 B1 | * | 5/2002 | McKinley .................... 359/619 |
| 6,614,594 B2 | * | 9/2003 | Murasugi et al. ........... 359/450 |
| 6,618,196 B2 | * | 9/2003 | Ikari et al. .................. 359/457 |
| 2002/0005985 A1 | * | 1/2002 | Murasugi et al. ........... 359/443 |
| 2002/0181098 A1 | * | 12/2002 | Utsumi et al. .............. 359/443 |

* cited by examiner

Primary Examiner—William C. Dowling
(74) Attorney, Agent, or Firm—Jay H. Maioli

(57) ABSTRACT

In a projector apparatus, one end of a fixing member is adhered to an outer peripheral portion of a back of a first screen, and a first pressing member having a protrusion is adhered to a back surface of the end of the fixing member. A fixing plate having a predetermined height is provided at an inside of housing frames, and a hole is formed in the fixing plate and a fixing protrusion is provided in the rearside of the hole. Further, a second pressing member is adhered to the outside of the protrusion of the front surface of the fixing plate. The fixing member adhered to the first screen is inserted from another hole and the fixing protrusion is engaged with the fixing hole formed in the other end of the fixing member.

5 Claims, 9 Drawing Sheets

PROJECTOR APPARATUS

CROSS REFERENCE TO RELATED APPLICATIONS

The present document is based on Japanese Priority Document JP2001-368895, filed in the Japanese Patent Office on Dec. 19, 2002 and JP2003-374546 filed in the Japanese Patent Office on Nov. 4, 2003, the entire contents of which being incorporated herein by reference.

BACKGROUND OF THE INVENTION

1. Field of the Invention

The present invention relates to a projector apparatus that projects an image on a screen group including a first screen and a second screen, which are fixed at predetermined distance, and more particularly, to an improvement of a fixing structure of a screen group.

2. Description of Related Art

A projector apparatus is known, which projects an image or the like on a comparatively large screen from back side and displays the image enlarged on a screen group. Specifically, in the projector apparatus, the image is enlarged by means of a projector lens of an optics unit and projected on the screen group.

The screen group includes a contrast screen as a first screen, and a combination of a lenticular lens (lenticular screen) and a fresnel lens (fresnel screen) as a second screen. When the lenticular lens and the fresnel lens are placed so as to be superposed each other, the lenticular lens is positioned between the contrast screen and the fresnel lens. The screen group is fixed to an opening formed on a front plane of a housing of the projector apparatus with a predetermined fixing structure.

Conventionally, a fixing structure for a screen in a projector apparatus has been proposed (for example, refer to a patent document 1). In the fixing structure described in the patent document 1, as shown in FIG. 1, a fixing plate 8 is provided at a predetermined height position to which a screen group is installed from front on an inner surface of a frame 7 of a housing 1 having an opening 2. The fixing plate 8 has a hole 10 and a fixing protrusion 9 formed at the rear of an inner edge of the hole 10. A fixing member 4 is adhered to the back surface of the contrast screen 3 through an adhesive member 12. The fixing member 4 has a L-shaped, one end thereof is adhered to the contrast screen 3 through the adhesive member 12 and other end has a hole 11 that engages with the fixing protrusion 9. In the condition such that the lenticuler screen 5 and the fresnel screen 6 are disposed on the front side of the fixing plate 8, the contrast screen 3 adhering the fixing member 4 is inserted from front, and the fixing protrusion 9 engages with the hole 11 formed on the other end of the fixing member 4, so that the lenticuler screen 5 and the fresnel screen 6 are sandwiched between the one end of the fixing plate 8 and the one end of the fixing member 4 for fixing, and the contrast screen 3 is also installed to the opening 2 of the housing 1.

[Patent Document 1]
Japanese Patent Application Publication No. 2002-341435

SUMMARY OF THE INVENTION

In the projector apparatus which adopts the fixing structure for the screen described in the patent document 1, although there are advantages in that the screen group constituted by a plurality of screens can be fixed easily and no design limitations with respect to the front side of the projector apparatus, there also are disadvantages as below.

This kind of projector apparatus has a large-size screen, such as a screen of 53 inches, and, as shown in FIG. 2, the contrast screen 3 and the lenticular lens 5 are positioned so as to have a gap GP of approximately 10 mm between the first screen and the second screen. For that reason, because of an environment change, such as a humidity or temperature change, particularly owing to a humidity change, the second screen becomes unstable. For example, the central portion of the second screen may expand greatly in accordance with a level of moisture absorption, and sometimes the lenticular lens 5 may come into contact with the contrast screen 3 as shown in FIG. 3, and then powdery object may be produced at the point where lenticular lens 5 abutted on and the contrast lens 3, or causing deterioration of the picture quality due to misalignment of a registration adjustment.

The present invention is made in view of the circumstances described above. The present invention provides a projector apparatus that may prevent a first screen and a second screen from abutting against each other even if the environment is changed, and may alleviate the deterioration of the picture quality.

One embodiment of the present invention provides a projector apparatus projecting and focusing an image to a screen group including a first screen and a second screen, which are fixed at a predetermined distance, including a housing provided with a fixing plate to which the group screen is installed from a front side, the fixing plate being disposed at a predetermined height from the inside of a frame of the housing, wherein a hole is provided at outerside of the fixing plate, and a fixing protrusion protruding outward is formed at the inner rear side of the hole, a fixing member adhered to an outer periphery portion of a back surface of the first screen included in the screen group, a first pressing member adhered to a back surface of the one end of the fixing member and having a protrusion protruded backward at the inner edge, and a second pressing member adhered to a predetermined position which is the front surface of the fixing member and the outerside of the protrusion of the first pressing member, wherein, the fixing member includes a flat one end adhered to a predetermined position of the periphery portion of the back surface of the first screen and another end bended backward from the outer edge of the flat one end and having a fixing hole for engaging with the fixing protrusion at the rear end, and wherein, the fixing protrusion of the housing is engaged with the fixing hole formed in the other end of the fixing member inserted from the hole formed in the fixing plate of the housing and adhered to the first screen, whereby the first screen of the screen group is fixed to the housing, and the second screen of the screen group is held and sandwiched by the protrusion of the first pressing member and the second pressing member so as that a moment is applied to shift the central portion of the second screen backward, whereby the second screen of the screen group is fixed to the housing.

According to the one embodiment of the present invention, even if the central portion of the second screen expands due to the environment change, the certain distance between the first screen can be kept, whereby it can prevent the second screen and the first screen from abutting against each other. Further, the expanding width of the second screen due to the environment change may be suppressed by virtue of the moment mentioned above, thus a possibility of abutting of the first screen onto the second screen becomes extremely small and prevents the picture quality from deteriorating.

As described above, according to the present invention, in the projector apparatus having a screen group constituted by a plurality of screens, there are advantages such that a projector apparatus is provided, which can prevent the first screen and the second screen from abutting against each other even if the environment is changed and can prevent deterioration of the picture quality.

BRIEF DESCRIPTION OF THE DRAWINGS

FIG. 10 is a graph showing a changing character of a distance (gap) D between a first screen and a second screen measured in the condition that a projector apparatus adopting a fixing structure according to the prevent invention is left in the atmosphere in which the room temperature of 25° C. and the humidity is changed to 50%, 90%, 30% and the like.

DESCRIPTION OF THE PREFERRED EMBODIMENTS

Hereinafter, detailed descriptions of the preferred embodiments of the present invention are explained based on accompanying drawings. Since the embodiment described following is a preferred embodiment of the present invention, there are various technically preferable limitations are provided. However, unless description that limits the present invention is provided, the scope of the present invention is not limited to these embodiments.

Figure 1:
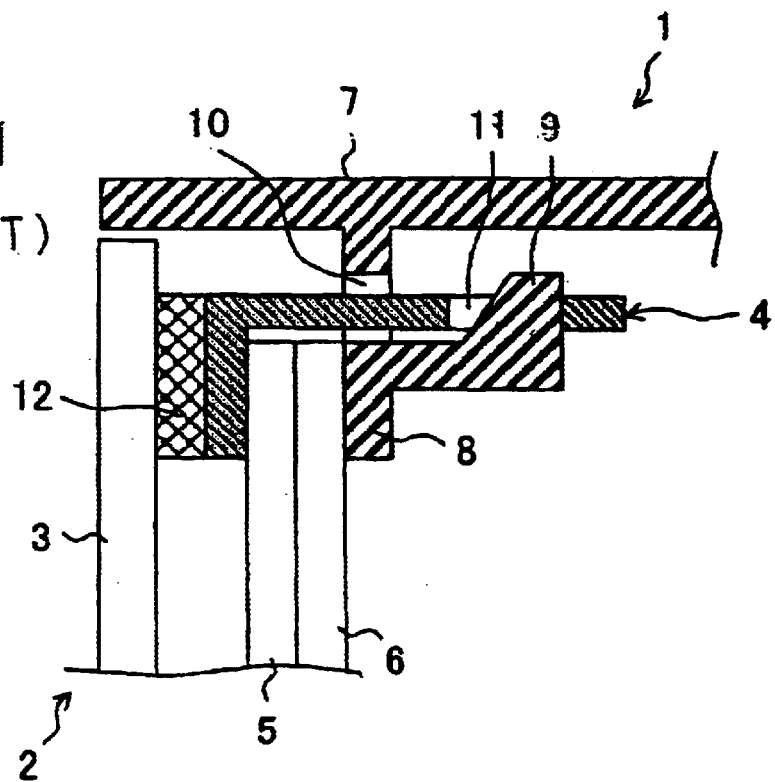
FIG. 1 is a cross-sectional view showing a fixing structure example for a screen of a conventional projector apparatus.
Figure 2:
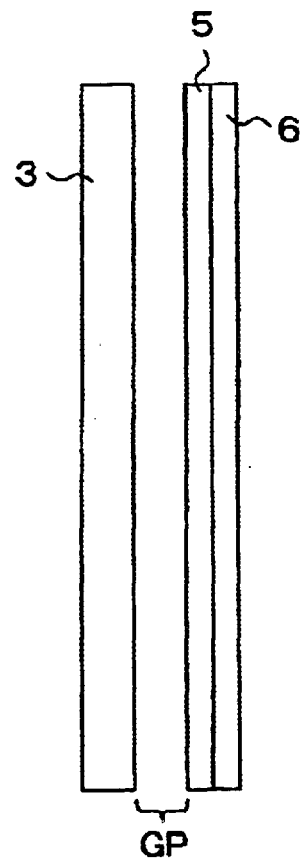
FIG. 2 is a diagram for explaining a conventional defect.
Figure 3:
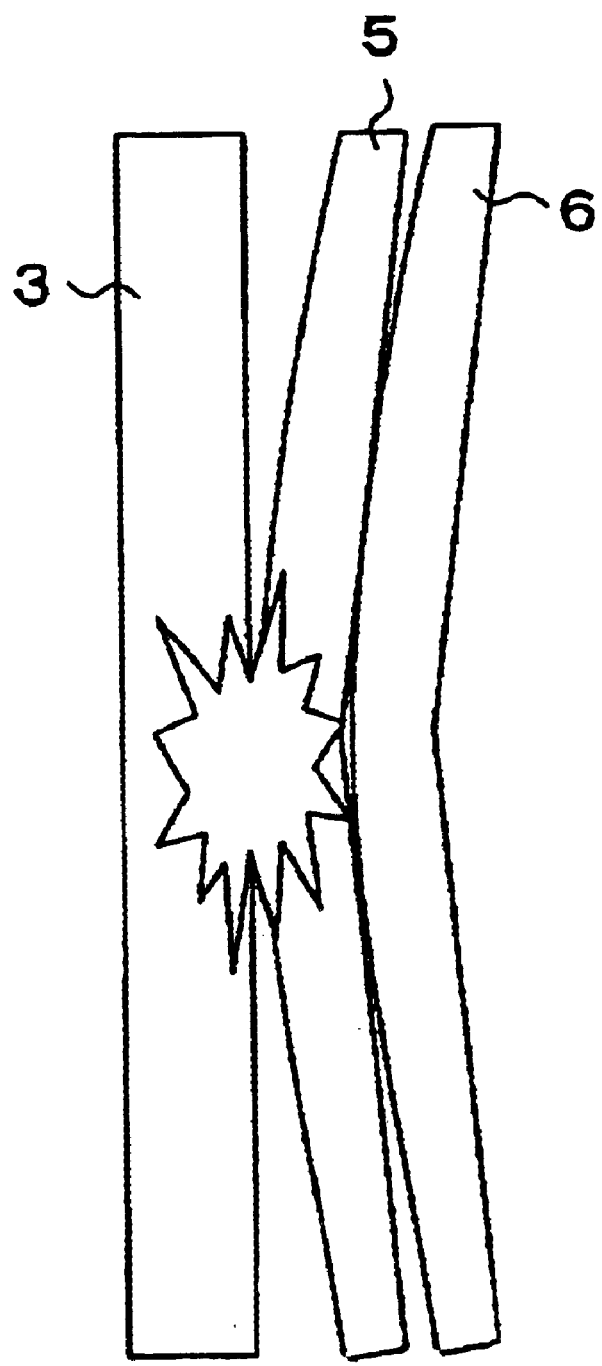
FIG. 3 is a diagram for explaining a conventional defect.
Figure 4:
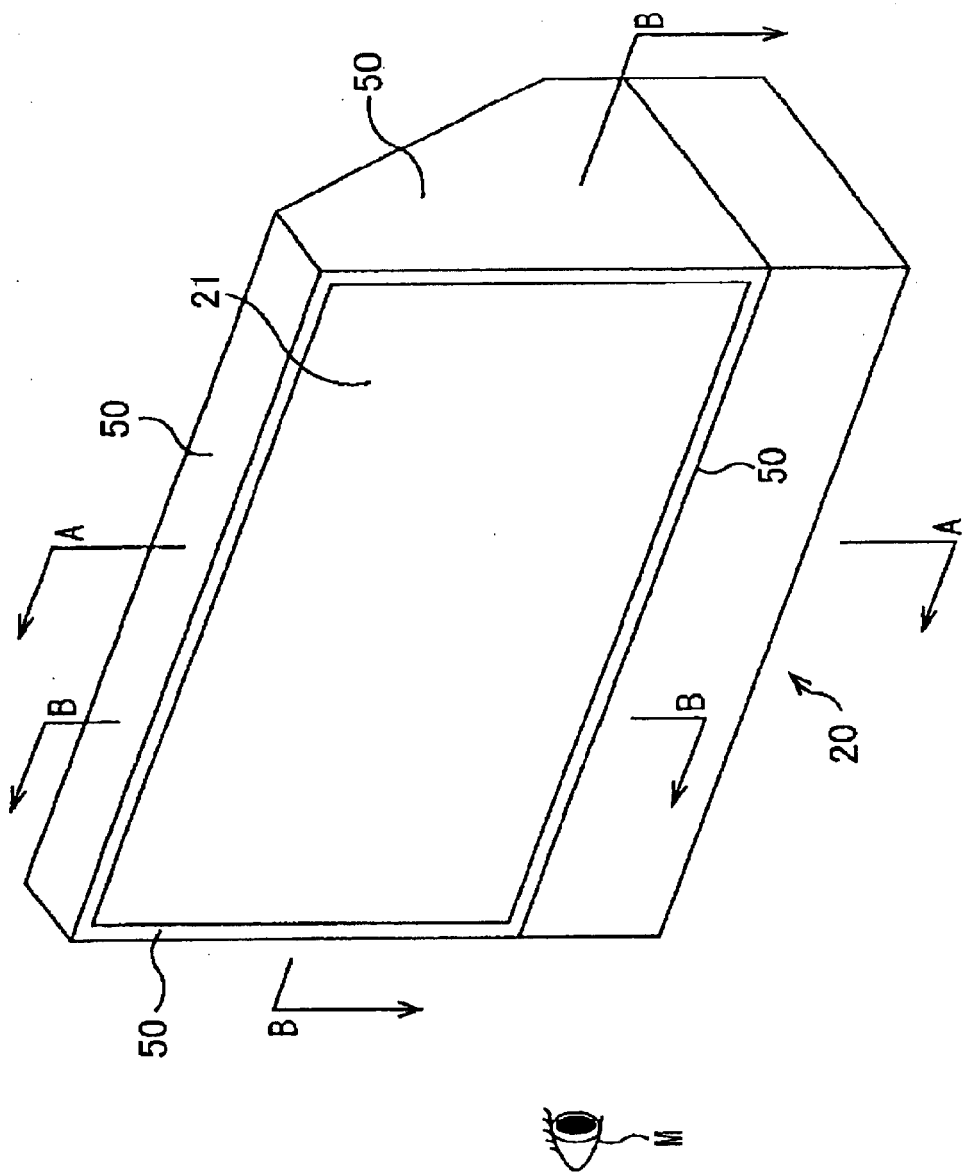
FIG. 4 is a perspective view showing a preferred embodiment of a projector apparatus of the present invention.
Figure 5:
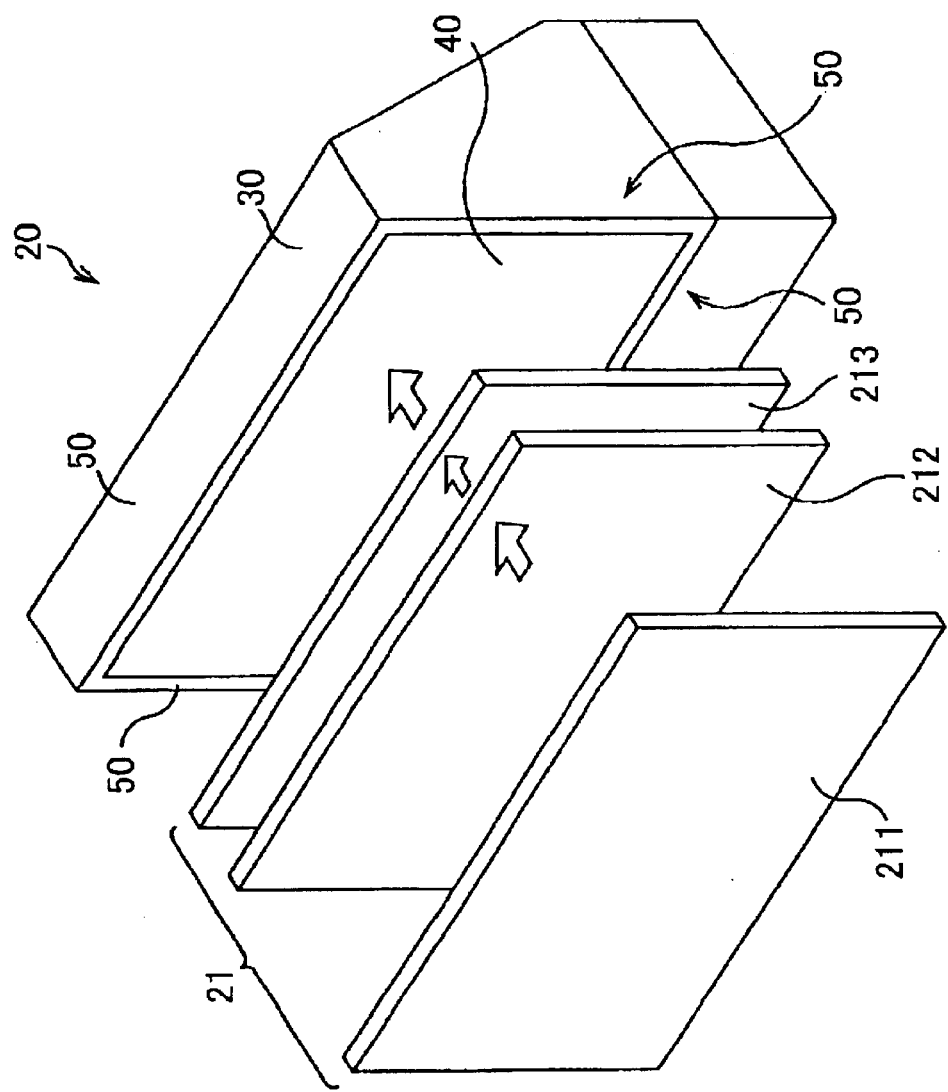
FIG. 5 is an exploded perspective view showing a housing and a screen group of the projector apparatus of FIG. 4.
Figure 6:
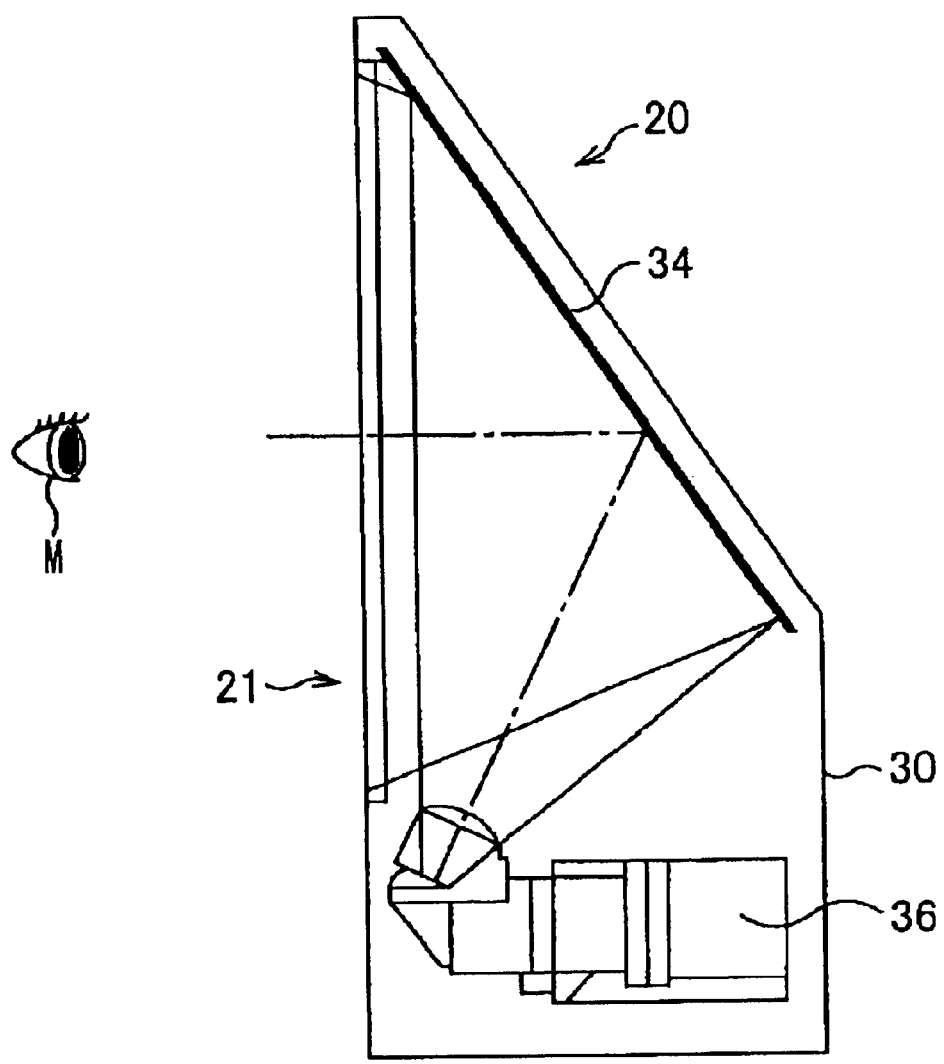
FIG. 6 shows an example of cross section structure of the projector apparatus viewed along a line A—A in FIG. 4.

FIG. 4 is a perspective view showing a preferred embodiment of a projector apparatus of the present invention, and FIG. 5 is an exploded perspective view showing a housing and a screen group of the projector apparatus of FIG. 4. FIG. 6 shows an example of a cross section structure viewed along a line A—A in FIG. 4.

A projector apparatus 20 shown in FIG. 4 and FIG. 5 is configured so that a color image and the like is projected on an inside of a screen group 21 to display the color image, thus an observer M can watch, for example, the color image projected on the screen group 21. The projector apparatus 20 has a housing 30, the screen group 21, a reflecting mirror 34, an optical unit 36 and the like, as schematically shown in FIG. 6. The optical unit 36, the reflecting mirror 34 and the screen group 21 are accommodated in the housing 30. The optical unit 36 has, for example, a color cathode-ray tube (CRT).

The image projected from the optical unit 36 is reflected by the reflecting mirror 34 and is projected on an inner surface of the screen group 21. The observer M can watch the image, such as the color image, projected through the screen group 21. The projector apparatus 20 having such configuration is called as a rear projection television display apparatus. The screen group 21 of the projector apparatus 20 shown in FIG. 5 is fixed to frame parts 50 of the housing 30 at the position of an opening 40 of the housing 30 so that the projected image to be focused. Preferably, the frame parts 50 are provided in four places, such as an upper, lower, right side and left side edges of the housing 30, and they form the opening 40, for example, in a rectangular shape.

The screen group 21 is constituted by several kinds of screens including a contrast screen 211, a lenticular lens 212 and a fresnel lens 213. The contrast screen 211 is corresponding to a first screen and is located at the outmost position from the opening 40 of the housing 30. The lenticular lens 212, which is also called as a lenticular screen, is corresponding to a second screen. The fresnel lens 213, which is also called as a fresnel screen, is also correspond to the second screen. The lenticular Lens 212 is placed between the contrast screen 211 and the fresnel lens 213. The lenticular lens 212 and the fresnel lens 213 are positioned inside of the contrast screen 211, that is, they are placed inside of the housing 30. In addition, although it is not shown, edges of the lenticular lens 212 and those of the fresnel lens 213 are fixed with a tape-shaped adhesive member so as to be superposed each other.

Figure 7:
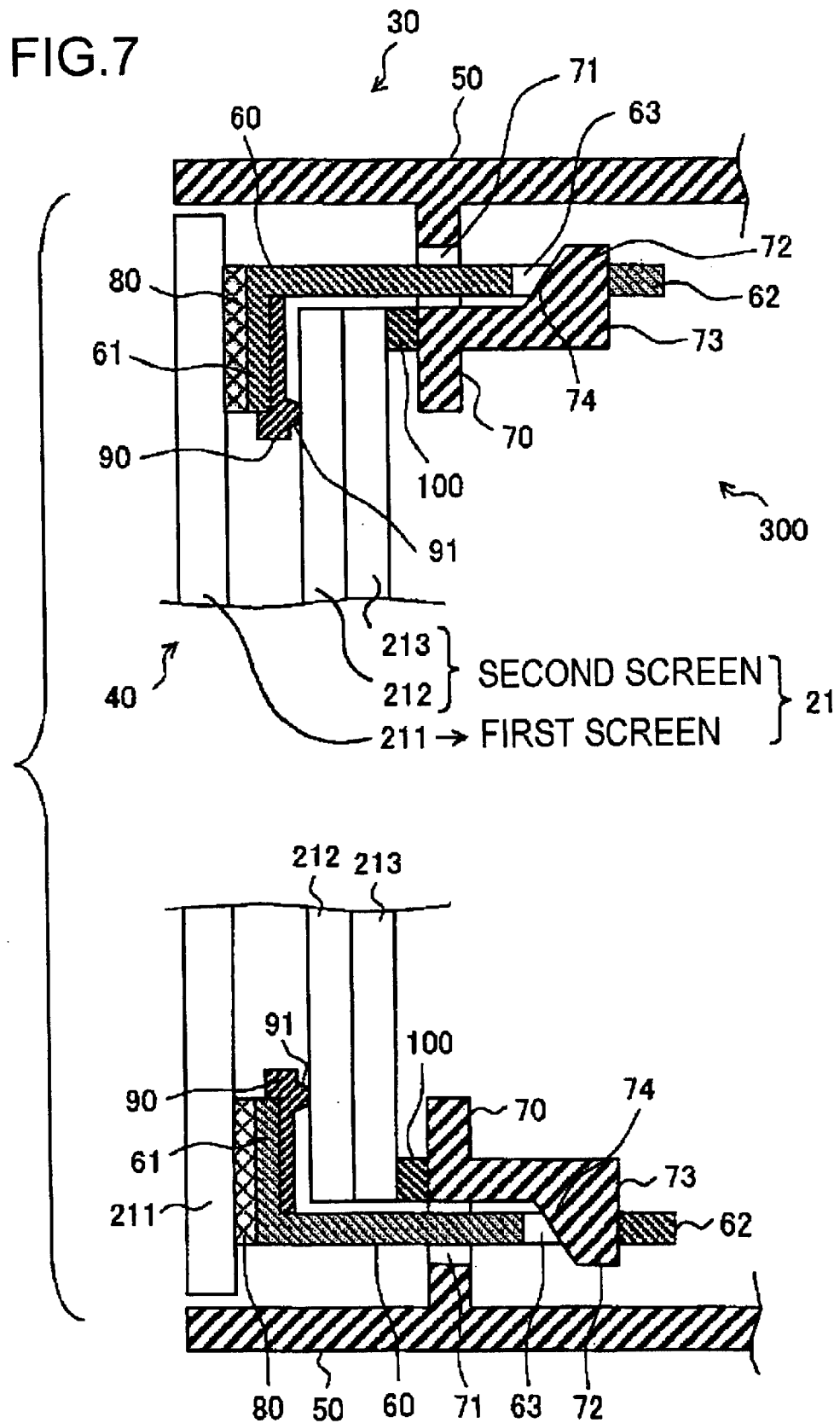
FIG. 7 is a cross-sectional view showing the fixing structure example for a screen viewed along a line B—B in FIG. 1.

FIG. 7 shows a cross section structure viewed along a line B—B of the projector apparatus 20 in FIG. 4. The cross section structure of FIG. 7 may be a cross section structure of the upper frame part 50 to the lower frame part 50 in FIG. 4, or, it may be a cross section structure of the right side frame part 50 to the left side frame part 50 in FIG. 4.

The contrast screen 211 shown in FIG. 7 and FIG. 5, which is also called as a front plate, is arranged for improving the contrast under the outside light and for protecting the surface of the lenticular lens 212 or the like facing the observer M side. The fresnel lens 213 positioned innermost is made of, for example, methyl methacrylate-styrene, acryl, polycarbonate or other materials. The fresnel lens 213 plays a role to change a divergent light flux of the image projected from the optical unit 36 shown in FIG. 6 to a parallel light flux. The lenticular lens 212 is made of, for example, polymethyl methacrylate, polycarbonate or other materials. The lenticular lens 212 plays a role, for example, to expand the image light parallelized by the fresnel lens 213 in horizontal direction of the screen.

Figure 8:
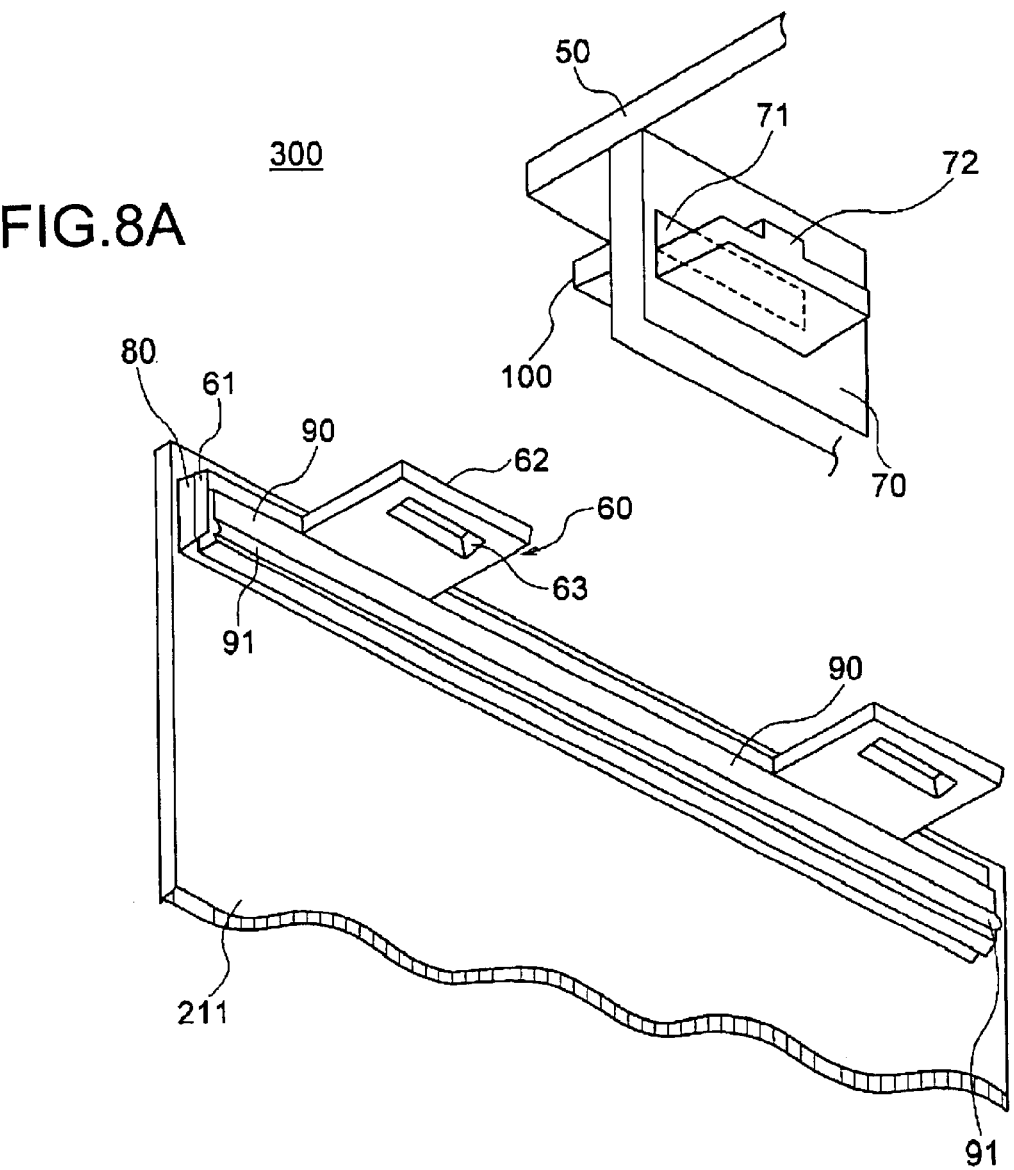
FIGS. 8A and 8B are perspective views showing a fixing member and a structure example at the fixing portion of a fixing structure for fixing a contrast screen.
Figure 9:
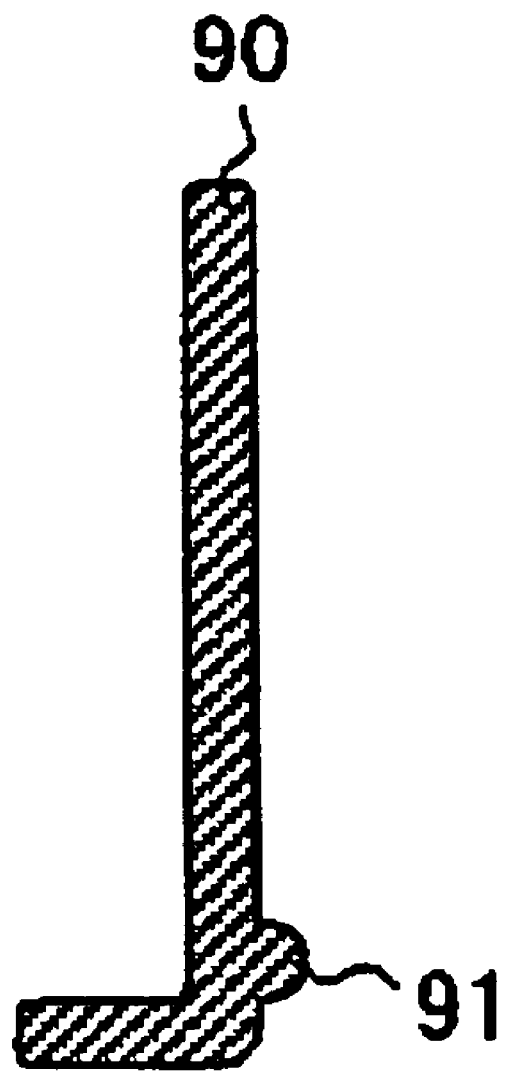
FIG. 9 is a diagram showing a structure example of a first pressing member according to the present embodiment.

In FIG. 7, the contrast screen 211, the lenticular lens 212 and the fresnel lens 213 are fixed to the housing 30 with a fixing structure 300 as shown in FIG. 8, which fixes the lenses to each frame part 50, such as upper, lower, right side, and left side edges of the housing 30.

FIG. 7 shows a cross-sectional view of the state when the fixing structures 300 are provided to the upper edge and lower edge of the housing 30. Of the two fixing structures 300, the fixing structure 300 provided at the upper edge is explained as below. In FIG. 7, at an inner surface of the frame part 50 of the housing 30 having the opening 40, a fixing plate 70 is provided at the position of a predetermined height to which the screen group 21 is installed along the entire crosswidth of the opening 40. The fixing plate 70 has a hole 71 near the inner surface of the frame part 50. At the lower edge of the hole 71, a fixing rib 73 having a fixing protrusion 72 at the tip thereof and a slope part 74 for uprise-engaging is provided at the rear end of the fixing rib 73. A fixing member 60 having a L-shaped cross-section is adhered to near the upper back surface of the contrast screen 211 through an adhesive member 80.

As shown in FIGS. 8A and 8B, a one end 61 of the fixing member 60 to be fixed to the contrast screen 211 through the adhesive member 80 is extended along the substantially crosswidth of the contrast screen 211, and the width of an other end 62 to be inserted into the hole 71 provided in the fixing plate 70 is made slightly smaller than the width of the hole 71. The other end 62 of the fixing member 60 has a fixing hole 63 to be engaged with the fixing protrusion 72, which is provided at the tip of the fixing rib 73 of the fixing plate 70. Two fixing structures 300 are provided in the width direction of the contrast screen 211. As described above, the one end 61 of the fixing members 60 extends across the entire width of the contrast screen 211 and the other ends 62 are provided in two positions where the fixing structures 300 are located, as shown in FIGS. 8A and 8B.

On the back surface of the one end 61 of the fixing member 60, a first pressing member 90 for pressing the lenticular lens 212 and the fresnel lens 213 toward the inner surface of the back of the housing 30 is adhered with an adhesive material or the like. The first pressing member 90 is adhered over the entire back surface of the one end 61 of the fixing member 60, a protrusion 91 is provided across the substantially entire width direction so as to abut and apply a pressing force to the predetermined position, which is lower than the upper edge position of the lenticluer lens 212. The first pressing member is made of elastic materials so as not to damage the surface of the lenticular lens 212 when the protruding portion 91 abuts on the lenticular lens 212.

On the front surface of the fixing plate 70, a second pressing member 100 is adhered to the fixing plate 70 across the entire width of the fixing plate 70 with an adhesive material or the like for pressing the each end of the lenticular lens 212 and the fresnel lens 213 toward the front of the housing 30.

The fixing structures 300 configured as above are also provided at the lower edge of the housing 30.

In the state that the lenticular lens 212 and the fresnel lens 213 (the second screen) are disposed at the front of the second pressing member adhered to the front surface of the fixing plate part 70, the one end 61 of the fixing member 60 is adhered to the back surface of the contrast screen 211 through the adhesion member 80 as mentioned above. Further, the contrast screen 211 (the first screen) to which the first pressing members 90 is adhered to two places, namely, the upper and lower portion, of the back surface of the one end 61 is inserted from the opening 40. The fixing protrusion 72 provided at the tip of the fixing rib 71 of the fixing plate 70 is inserted into the fixing hole 63 provided in the other end 62 of the fixing member 60. Thus, the lenticular lens 212 and the fresnel lens 213 (the second screen) are held and sandwiched by the protrusion 91 of the first pressing member 90 and the second pressing member 100. Furthermore, the protrusion 91 and the second pressing member 100 apply a moment so as to force the central portion in the vertical direction of the lenticular lens 212 and the fresnel lens 213 (the second screen) to shift backward.

In the present embodiment, the fixing member 60 descried above is made of a sheet metal and the housing 30 is a plastic molded. Accordingly, when the contrast screen 211 (the first screen) to which the fixing member 60 is adhered is inserted from the opening 40, the tip of the other end 62 of the fixing member 60 presses and bends the tip of the fixing rib 73 inward along the slope part 74 of the fixing protrusion 72 provided at the tip of the fixing rib 73 of the fixing plate 70, thus the fixing protrusion 72 is engaged with the fixing hole 63. Alternatively, the fixing member 60 may be made of plastic so as to bend the other end 62 outward. In addition, the fixing member 60 may be configured to have a T-shape cross-section.

When the screen group 21 is attached to the housing 30 with the fixing structures 300 as described above, the central portion in the vertical direction of the second screen is made to shift backward by the moment applied from the protrusion 91 of the first pressing member 90 and the second pressing member 100 to the upper edge and lower edge of the second screen. As a result, the gap GP between the first screen and the second screen is widened to approximately 15 mm, as compare to the conventional gap of approximately 10 mm, in the case where a projector apparatus having a large-sized screen of 53 inches.

Therefore, even if the central portion of the second screen is expanded due to the environment change, such as the humidity change, the certain distance between the first screen and the second screen can be kept, making it possible to prevent the problem such that the second screen abuts on the first screen by the expansion. In addition, by virtue of the above moment, an expanding amount of the second screen due to the environment change may be controlled, thus a possibility of abutting the second screen to the first screen becomes extremely small, and further, the deterioration of picture quality may be prevented.

Figure 10:
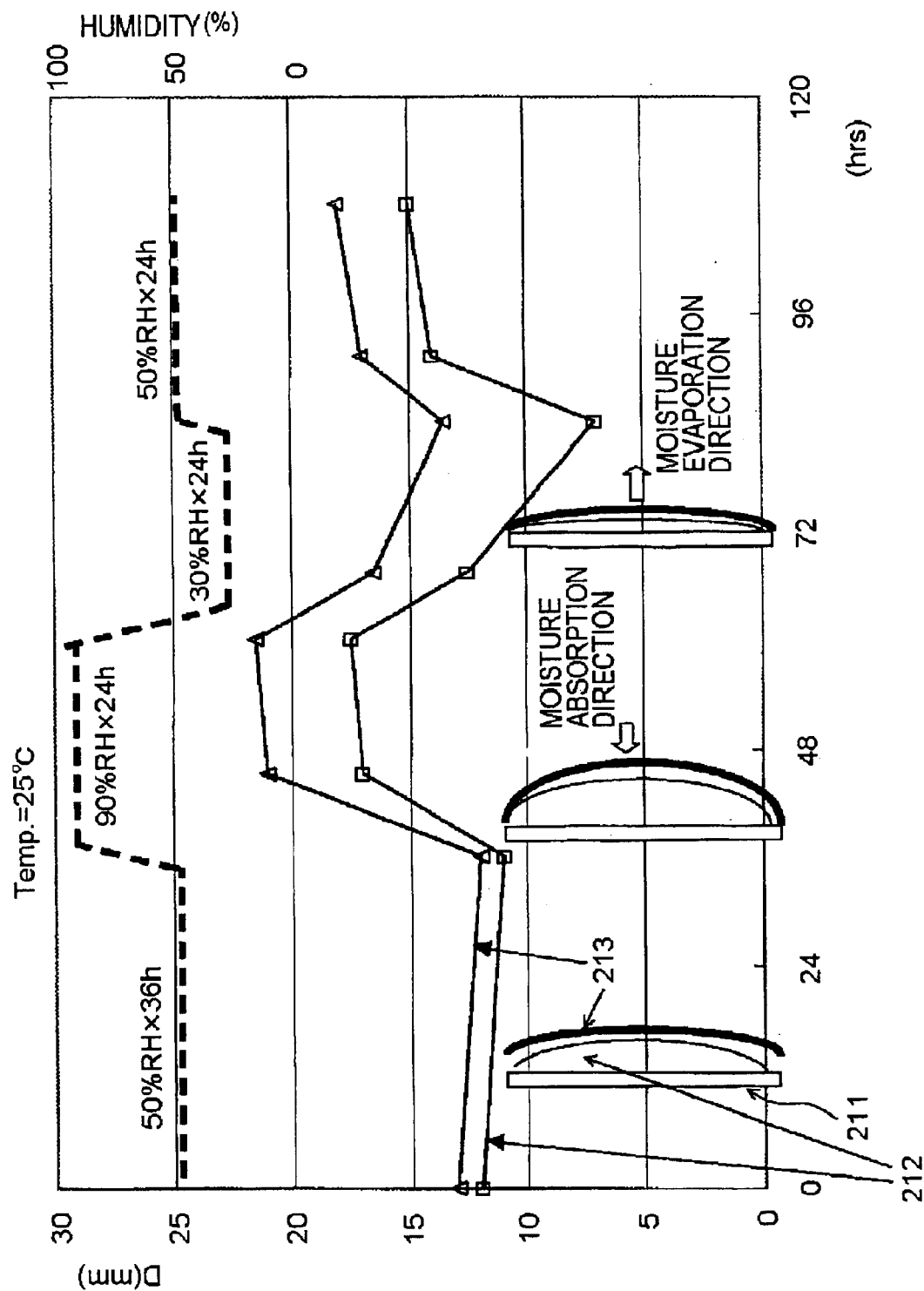

FIG. 10 is a graph showing an example of a changing character of a distance (gap) D between the first screen (contrast screen 211) and the second screen (lenticular lens 212) measured in the condition that a projector apparatus 10 adopting a fixing structure according to the prevent invention was left in the atmosphere in which the room temperature of 25° C. and the humidity was changed to 50%, 90%, 30% and the like. In FIG. 10, an abscissa axis indicates time, a left side ordinates axis indicates distance D, and a right side ordinates axis indicates humidity, respectively. In addition, for easy understanding, the state of the screen in each humidity condition of 50%, 90%, and 30% is schematically shown.

As can be understood from FIG. 10, in the fixing structure according to the present embodiment, the distance (gap) D between the first screen (contrast screen 211) and the second screen (lenticular lens 212) is approximately 13 mm±5 mm, it is smaller as compared to the conventional change amount according to the humidity change, such as approximately 10 mm±10 mm. Therefore, the present embodiment allows an easy registration adjustment, prevents occurring the problem such that lenticular lens 212 abuts on the contrast screen 211 even if the central portion of the second screen is expanded, and surely prevents the generation of powdery objects.

However, the present invention is not limited to the embodiment described above. In the embodiment as above, the fixing structure for fixing the first screen and the second screen may not only be formed on the upper and lower edges of the frame part but also on the right side and left side edges of the same, or may be formed a first screen fixing portion and a second screen fixing portion only at the upper and lower edge of the frame part or only at the right side and left side of the same.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A projector apparatus for projecting and focusing an image onto a screen group including a first screen and a second screen that are fixed apart by a predetermined distance, the apparatus comprising:

a housing provided with a fixing plate to which said screen group is installed from a front side, said fixing plate being disposed at a predetermined height from an inside of a frame of said housing, wherein a hole is provided at an outer side of said fixing plate, and a fixing protrusion protruding outward is formed at an inner rear side of said hole;

a fixing member adhered to an outer periphery portion of a back surface of said first screen included in said screen group;

a first pressing member adhered to a back surface of one end of said fixing member and having a protrusion protruded backward at an inner edge thereof; and a second pressing member adhered to a predetermined position on a front surface of said fixing member and an outer side of said protrusion of said first pressing member, wherein, said fixing member includes a flat end adhered to a predetermined position of said periphery portion of said back surface of said first screen and an other end backward from an outer edge of said flat end and having a fixing hole for engaging with said fixing protrusion at the rear end, and wherein, said fixing protrusion of said housing is engaged with said fixing hole formed in said other end of said fixing member inserted from said hole formed in said fixing plate of said housing and adhered to said first screen, whereby said first screen of said screen group is fixed to said housing, and said second screen of said screen group is held and sandwiched by said protrusion of said first pressing member and said second pressing member so that a moment is applied to shift a central portion of said second screen backward, whereby said second screen of said screen group is fixed to said housing.

2. The projector apparatus according to claim 1, wherein at least said protrusion of said first pressing member is made of a material that does not damage a front surface of said second screen.

3. The projector apparatus according to claim 2, wherein said protrusion of said first pressing member has elasticity.

4. The projector apparatus according to claim 1, wherein said first screen is a contrast screen that improves contrast under outside light and protects said second screen.

5. The projector apparatus according to claim 4, wherein said second screen comprises a fresnel screen for changing a divergent light flux to a parallel light flux and a lenticular screen for expanding said parallel light flux.

* * * * *